United States Patent

[11] 3,547,090

[72] Inventor James M. Seliger
303 SE. 172nd Ave., Portland, Oregon 97233
[21] Appl. No. 761,916
[22] Filed Sept. 24, 1968
[45] Patented Dec. 15, 1970

[54] DEVICE FOR DECREASING FORMATION OF WASTE PRODUCTS OF COMBUSTION FROM ENGINES
4 Claims, 4 Drawing Figs.

[52] U.S. Cl. .................................................. 123/119
[51] Int. Cl. ................................................F02m 13/00
[50] Field of Search........................................... 123/119, 119A, 119B, 119D

[56] References Cited
UNITED STATES PATENTS

| | | | |
|---|---|---|---|
| 1,353,454 | 9/1920 | Cochran...................... | 123/119 |
| 1,382,285 | 6/1921 | Harris........................... | 123/119 |
| 1,420,615 | 6/1922 | Weber.......................... | 123/119 |
| 1,766,676 | 6/1930 | Moore.......................... | 123/119 |
| 2,166,720 | 7/1939 | Gorleski...................... | 123/119 |
| 2,185,320 | 1/1940 | Spearman.................... | 123/119 |

FOREIGN PATENTS

| | | | |
|---|---|---|---|
| 29,795 | 1/1932 | Australia...................... | 123/119 |
| 1,206,353 | 8/1959 | France ......................... | 123/119 |
| 250,274 | 9/1926 | Italy ............................. | 123/119 |

Primary Examiner—Wendell E. Burns
Attorney—Eugene M. Eckelman

ABSTRACT: An open-center insert is installed in the fuel intake system of an internal combustion engine between the fuel mixing device and the intake manifold and has a hollow tube member extending diametrically across its open center. This tube member supports a baffle which serves to create a vacuum directly therebeneath in turn creating a vortex agitating action of the fuel mixture for better combustion. One end of the tube is connected into the crankcase breather tube of the engine by a conduit and has an aperture on its bottom side whereby suction created at the bottom of the baffle by the vortex causes unburned gases and fumes from the crankcase to be drawn back into the intake manifold for reburning.

PATENTED DEC 15 1970
3,547,090
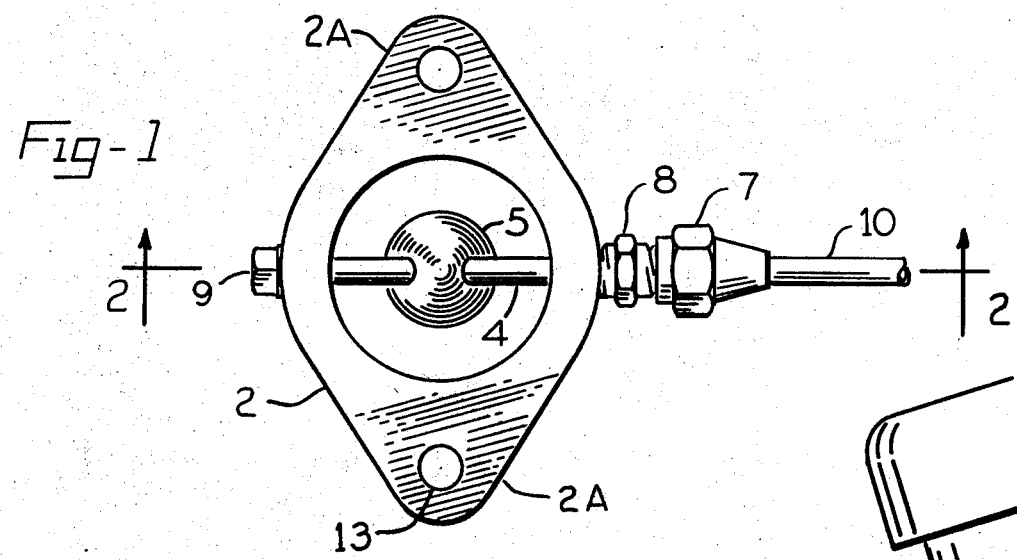
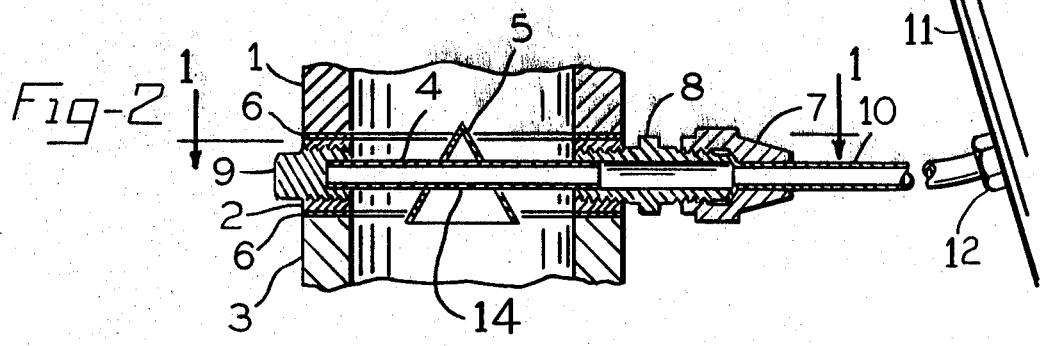
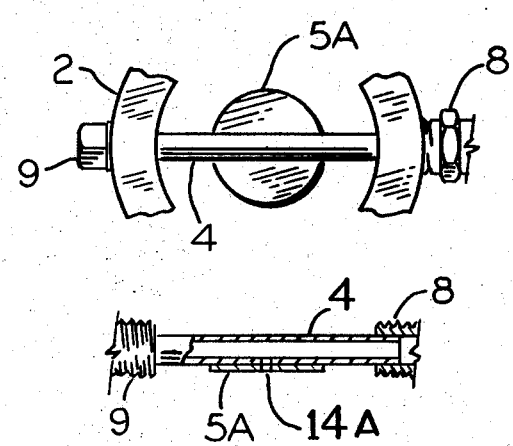
INVENTOR
JAMES M. SELIGER
BY
Eugene M. Eckelman
ATTORNEY

3,547,090

DEVICE FOR DECREASING FORMATION OF WASTE PRODUCTS OF COMBUSTION FROM ENGINES

BACKGROUND OF THE INVENTION

This invention relates to a new and novel device for decreasing the formation of waste products from internal combustion engines.

It is well known that and other vehicles having internal combustion engines discharge a great quantity of waste products and contribute greatly to the serious smog problem which now exists. Much of the waste products from the internal combustion engines are a result of inefficient burning of fuel as well as from worn engines wherein oil escapes past the pistons and when burned causes smoke to be discharged from the engine. Much of the smoke and of course other waste products of combustion such as unburned gases and fumes are discharged from the exhaust pipe but others exist in the crankcase of the engine and escape through the breather outlet of the engine.

SUMMARY OF THE INVENTION

It is a principal objective of the present invention to provide a device which increases the efficiency of combustion of internal combustion engines and also draws unburned gases and fumes from the crankcase to the intake manifold so that said unburned gases and fumes can be reburned, thus decreasing the amount of waste products of combustion discharge from the exhaust pipe as well as from the engine breather pipe.

A more particular object of the present invention is to provide means adapted to be mounted in the intake portion of the fuel system employing in one embodiment a hollow cone-shaped baffle which not only serves to agitate the fuel mixture in the intake for more efficient combustion but also serves to draw in unburned gases and fumes from the engine crankcase for reburning. Another embodiment employs a disclike baffle to accomplish the same purpose.

Still another object is to provide a device of the type described which is embodied in an insert capable of convenient installation in existing fuel intake systems.

The invention will be better understood and additional objects and advantages will become apparent from the following description which illustrates preferred forms of the device.

BRIEF DESCRIPTION OF THE DRAWINGS

FIG. 1 is a top plan view of a first embodiment of a device incorporating features of the present invention, this view being taken on the line 1—1 of FIG. 2;

FIG. 2 is a vertical central sectional view taken through the insert as installed in an intake manifold, taken on the line 2—2 of FIG. 1;

FIG. 3 is a fragmentary plan view of a second embodiment of the invention; and

FIG. 4 is a vertical sectional view of the embodiment of FIG. 3.

DETAILED DESCRIPTION OF PREFERRED EMBODIMENTS

Referring in particular to the drawings and first to FIGS. 1 and 2 which show one embodiment, the numerals 1 and 3 designate parts of an existing fuel intake system for an internal combustion engine. More particularly, the numeral 1 designates the outlet from a carburetor and the numeral 3 designates the inlet to an intake manifold. Fuel mixture from the carburetor passes downwardly into the manifold for distribution to the engine.

According to the invention an insert 2 having a hollow center has a construction facilitating its installation between the carburetor portion 1 and the intake manifold 3, and for this purpose it is shaped in plan as illustrated in FIG. 1, having lateral projections 2A which correspond in shape to similar lateral projections provided on the carburetor and intake manifold at their connection. The lateral projections 2A have bolt holes 13 therein for receiving clamping bolts which are used to secure the carburetor and intake manifold together. Gaskets 6 are provided on each side of the insert for sealing. According to the structure of the insert, it may be readily installed between the carburetor and intake manifold after first removing the securing bolts.

Diametrically disposed in the insert 2 is a tubular member 4 having a sealing connection at one end in a plug 9 threadedly mounted in the insert 2. The other end of tubular member 4 is received in a hollow fitting 8 having threads at each end for securement to the insert and for threadedly receiving a connector 7 for attaching a conduit 10 into the fitting 8 and thus into the tube 4. The opposite end of conduit 10 is connected into the vehicle crankcase breather tube 11 by a suitable fitting 12.

Mounted on the tube 4 is a hollow, cone-shaped baffle 5 having its apex directed upwardly. For the purpose of mounting the baffle 5 on the tube 4, said baffle may be suitably apertured to receive the tube and the parts are connected integrally by a press fit or by any other means such as by welding. The bottom of the baffle 5 is open. An aperture 14 is provided in a lower wall portion of the tube within the hollow baffle 5.

A fuel mixture from the carburetor 1 is drawn downwardly into the intake manifold for movement to the engine for combustion. According to the present invention, such fuel mixture as it travels downwardly impinges against the baffle 5 and is directed into a vortex pattern around and below the baffle to efficiently mix the air and fuel and thus increase the efficiency of combustion. Such vortex action creates a vacuum directly under the baffle 5 and the vacuum thus created also exists in tube 4 through aperture 14 to draw in unburned gases and fumes from the crankcase breather tube 11 through the connecting conduit 10. Such unburned gases and fumes thus are gain passed through the engine and unburned portions thereof will be consumed. Thus, not only are the waste products of combustion decreased by the greater efficiency of combustion as a result of the improved mixture of fuel and air but also by the reburning of unburned gases and fumes withdrawn from the crankcase. The discharge of waste products from the exhaust pipe as well as from the engine breather tube is reduced appreciably, even on engines which are worn considerably.

FIGS. 3 and 4 illustrate a modified form of the invention wherein the baffle 5A on the tube member 4 comprises a disclike member instead of a cone-shaped device. Disc 5A is secured to the lower side of the tube and an aperture 14A passes through both the tube and the baffle. The baffle may be secured to the tube in any suitable manner such as by welding. The air fuel mixture which passes downwardly through the carburetor and intake manifold is directed into a vortex pattern as in the embodiment of FIG. 1, which increases combustion efficiency and which also creates a suction immediately below the disc 5A to draw unburned gases and fumes from the crankcase for reburning.

The embodiments of the present invention are thus directed not only to producing better fuel consumption and efficiency of combustion but also to reducing the formation of waste products in such engines. It is to be understood that the forms of my invention herein shown and described are to be taken as preferred examples of the same and that various other changes in the shape, size or arrangement of parts may be resorted to.

I claim:

1. A device for reducing the discharge of waste products of combustion from an internal combustion engine having an oil crankcase and fuel intake passageway through which a fuel mixture is drawn from a fuel mixing device to the engine, comprising:

a. a stationary tubular member arranged to be mounted in said fuel intake passageway in laterally extending relation to the passageway;

b. conduit means connected to said tubular member and arranged to be connected to said oil crankcase for directing unburned gases a and fumes from the oil crankcase to said tubular member;

c. a baffle member secured on said tubular member with a surface thereof extending laterally across the fuel intake passageway to cause a vortex type agitation of the fuel mixture as the latter travels thereby for increasing the combustion efficiency of the fuel mixture;

d. said vortex type agitation creating a vacuum directly beneath said baffle member by the impingement of the fuel mixture on said baffle member as the fuel mixture moves thereby;

e. and downwardly directed outlet means in said tubular member within the fuel intake passageway;

f. the movement of fuel through the fuel intake passageway and the vacuum beneath the baffle member from said vortex type agitation being arranged to draw the unburned gases and fumes from the crankcase through said conduit for reburning.

2. The device of claim 1 wherein said baffle member comprises an open bottom hollow core mounted on said tubular member with its apex pointed upstream with relation to the direction of flow of fuel in the fuel intake passageway.

3. The device of claim 1 wherein said baffle member comprises an open bottom hollow cone mounted on said tubular member with its apex pointed upstream with relation to the direction of flow of fuel in the fuel intake passageway, the said tubular member projecting through said cone intermediate the apex and base thereof whereby the said base is disposed downstream from said tubular member.

4. The device of claim 1 wherein said baffle member comprises a disc secured to said tubular member.